United States Patent Office 3,180,051
Patented Apr. 27, 1965

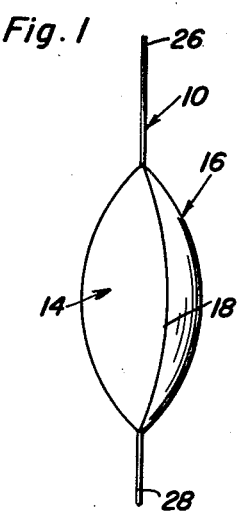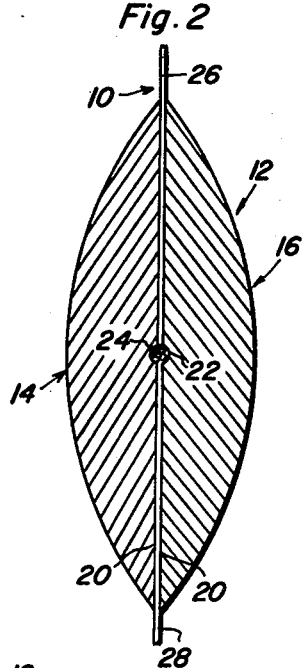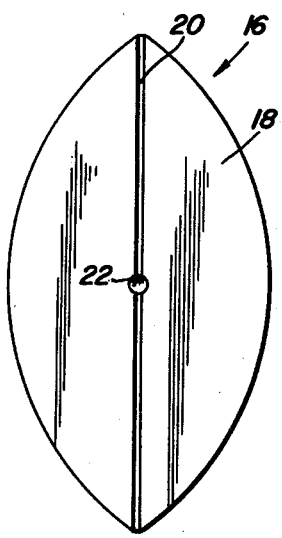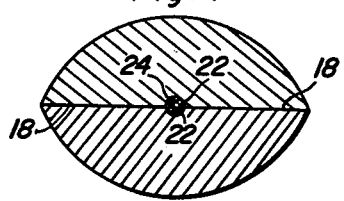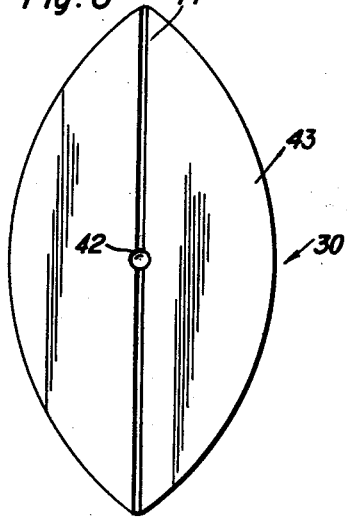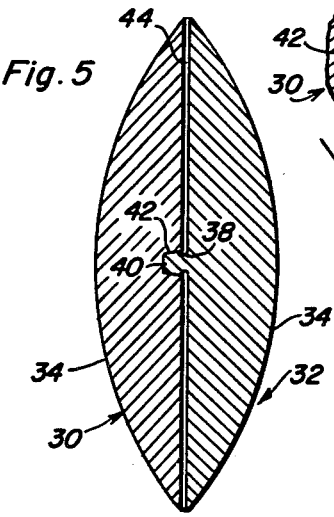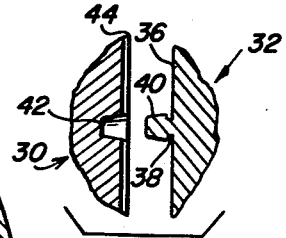

3,180,051
FISHING LINE SINKER
George D. Freeman, 601 N. State, Emmetsburg, Iowa
Filed Dec. 12, 1962, Ser. No. 244,179
5 Claims. (Cl. 43—43.12)

The present invention relates to a sinker, more particularly, to a sectional sinker which is mounted on and connected with the fishing line in a novel manner.

By way of introduction it is to be pointed out that the subject matter of the instant application for patent is a continuation-in-part of copending application U.S. Serial No. 172,479, filed February 12, 1962, and now abandoned.

With respect to prior art sinkers it is common practice to provide split lead and equivalent sinkers and to clench or clamp the same on the line. Other instances are where a weight or an equivalent sinker is provided with a clip or equivalent attaching and clamping means which frictionally grips the line and holds the sinker in place.

It is an objective in the instant matter to structurally, functionally and in other ways improve upon sectional sinkers whether ball-like, elongated or other shapes such as commonly used by anglers.

More particularly, it is an objective to dispense with clips, clamps and equivalent locking and retaining devices and to provide a simple, practical and economical sectional sinker, preferably one which is made up of a pair of substantially duplicate companion sections and wherein the sections have opposed faces, a portion of the fishing line being sandwiched therebetween and being capable of retaining a selected or given position relative to the sinker in an unusually simple and unique manner.

In carrying out one embodiment of the invention correspondingly made elongated half-sections are provided and these have opposed substantially planar faces at least one of which has a lengthwise groove for reception and retention of the line, said sections being retained together and in position on the line by coercive magnetic forces.

A further improvement resides in a sinker having half-sections with inner opposed flat faces, said faces being each provided with lengthwise grooves and said grooves registering with each other, median portions of the grooves having operating cavities therein which together provide a pocket, said pocket designed and adapted for reception and retention of a knot on the line whereby when the knot is pocketed and the two sections are positioned on opposite sides of the line and held in coacting relationship by magnetic forces, the sinker is thus mounted on the line.

Novelty is also predicated on a sinker construction which is characterized by sectional component parts preferably half-sections having opposed planar surfaces with one surface having a longitudinal line groove, the intermediate portion having a recess, said recess to accommodate a telescoping headed shank on the cooperating section, and said shank embodying a neck around which a portion of the line may be wound and thus attached in a manner to obviate the necessity of utilizing a pocketed knot.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective showing a sectional sinker constructed in accordance with the invention and illustrating its normal appearance on a conventional fishing line;

FIGURE 2 is a view on an enlarged scale and in longitudinal section which serves to show the knot in the line and the manner in which it is contained and anchored in the pocket provided therefor;

FIGURE 3 is a view in elevation observing one interior side surface of one of the sections of the sinker;

FIGURE 4 is a central cross-sectional view based on FIGURE 2;

FIGURE 5 is a view in lengthwise section showing a modified embodiment of the sinker;

FIGURE 6 is a view similar to FIG. 3 but showing the centralized recess which is adapted to receive the headed line attaching neck;

FIGURE 7 is a fragmentary view in section which brings out the headed neck and the recess or pocket into which it is telescopingly fitted when the two half-sections are joined together in the manner illustrated in FIGURE 5.

With reference now to FIGURES 1 to 4, inclusive, the fishing line is denoted by the numeral 10. The sectional sinker is denoted by the numeral 12. An elongated type sinker is shown but obviously it may be one wherein the component parts go to make up a spherical, block-like, ovate, ellipsoidal or corresponding shape. The complemental half-sections of this sinker are substantially alike in construction and one half-section, the one at the left in FIGS. 1 and 2 is denoted by the numeral 14 and the one at the right by the numeral 16. When parted the interior planar surfaces or faces are denoted at 18 and these faces are designed and adapted to come into substantially tight and abutting contact with each other when the sinker is on the line in the manner illustrated in FIGURES 1, 2 and 4. Each surface in each section is provided with a lengthwise line accommodating groove 20 and these two grooves come together in alignment to permit the cooperating portion of the line to be seated therein and thus pass between the sinker sections 14 and 16. The median portions of the grooved surfaces are provided with registrable semi-spherical recesses 22 which when brought into registry with each other provide a substantially spherical cavity or pocket. This pocket is adapted to receive a sinker positioning and retaining knot 24 with the portions 26 and 28 seated in the portions of the registering groove 20 with which they cooperate in the manner illustrated. The half-sections 14 and 16 may both be permanent magnets or the construction may be that wherein one section is a permanent magnet and the other section magnetizable material. The half-sections 14 and 16 are preferably made from magnetic material capable of providing reliably strong attractive and coercive forces. More likely than not the manufacturer will adopt a magnet made from aluminum, nickel, iron and cobalt providing an Alnico magnet.

In practice the two half-sections 14 and 16 are positioned opposite each other with the fishing line therebetween. Their mutual attraction draws them together providing a firm grip on the knotted portion of the line which is retained in the pocket without requiring the use of ancillary mechanical clamping or equivalent retaining devices. The attraction of the half-sections draws them together for retained position until the fisherman desires to separate and discard them. Experience has shown that with a magnet type sinker as herein shown and described the sinker can be, if desired, detached from the line. For example and assuming that the sinker (FIGS. 1 to 4, inclusive) has gotten caught or snagged between rocks or the like, a quick jerk of the fishing line will serve to separate the half-sections 14 and 16 and free the line. It follows, therefore, that the sinker is easily and quickly attached to and detached from the line. Also by reason of the fact that the component sections of the sinker are positioned and maintained in a desired position by magnetic attraction, a highly improved and reliable result is assured.

With reference now to the modifications illustrated in FIGS. 5, 6 and 7, it will be evident that the same general theme of the invention is carried out. Two companion half-sections 30 and 32 are provided, the same having convex exterior surfaces 34 and planar or substantially smooth flat interior surfaces one of which is denoted at 36 in FIG. 7, this section being provided at its central or median portion with a reduced neck 38 terminating in a slightly enlarged tapering or truncated conical head 40 which is adapted to fit telescopically into a recess or socket 42 provided therefor in the cooperating surface 43 (FIG. 6) of the half-section 30. In this embodiment the surface 43 is provided centrally and lengthwise with an open-ended channel or groove 44 for reception and retention of that portion of the line which is to be seated therein. Instead of having the opposed recesses 22 defining a cavity for the knot 24, the portion of the line (not shown) which is connectible to the sinker is wrapped at least one time around its neck and is thus attached to the half-section 32. Then when the two sections 30 and 32 are pressed together and magnetically joined, the line is accommodated and is attached to the sinker (or vice versa) whereby to obtain the desired attaching and retaining result without having to resort to the use of mechanical clips, clamps or equivalent devices.

It is believed that a careful consideration of the specification in conjunction with the views of the drawing will enable the reader to obtain a clear and comprehensive understanding of the construction of the component parts, the features and advantages thereof and the advantageous and improved results which are attained when the invention is being used. Consequently, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fishing line and a readily applicable and removable sinker, said sinker comprising a pair of duplicate companion half-sections, said half-sections constituting solid weights and being oriented and cooperatively aligned with each other and having inwardly disposed flat surfaces between which a cooperating portion of the line is adapted to be sandwiched and clampingly held, at least one of said half-sections comprising a permanent magnet and the flat surface thereof having a centrally positioned open ended linearly straight groove in which the aforementioned cooperating portion of said line is removably seatable, the other half-section comprising magnetizable material so that when the cooperable flat surfaces are intentionally placed face to face said half-sections are accordingly maintained in sinker-forming line-clamping relationship by the then existing coercive magnetic forces, the aforementioned one-half section being provided with a lateral recess in line with the median portion of said groove midway between the opposite ends of said groove, the aforementioned cooperating portion of said line being seated in said groove and having a knot formed therein and a portion of said knot being removably seated in said recess.

2. A sinker capable of being readily attached to and detached from a fishing line having a positioning and anti-slipping knot, said sinker comprising a pair of complemental substantially duplicate elongated weighted half-sections having opposed planar aligned and coacting surfaces, each of said surfaces being provided with a centralized open-ended groove, the grooves of the respective planar surfaces being aligned with each other and permitting removable seating of coacting portions of the fishing line in a manner to sandwich said portions between said surfaces, said half-sections comprising permanent magnets, both of said planar surfaces having median portions thereof provided with relatively small semi-spherical recesses in line with the median portions of the respective grooves, said recesses being registered with each other and providing a pocket for reception and retention of the anti-slipping knot on the aforementioned fishing line.

3. The structure defined in claim 2 and in combination, a fishing line having a portion thereof removably seated in said grooves, and a median part of said portion of the line being provided with a knot and said knot being retentively but removably seated and held in said pocket.

4. A readily applicable and removable sinker comprising a pair of duplicate half-sections, each half-section comprising a weighted permanent magnet, said half-sections having inwardly disposed flat abutting surfaces, the inner flat surface of at least one of said half-sections being provided with a centrally positioned longitudinal open-ended line seating groove and being further provided with a keying socket which is in a plane normal to the plane of said inner flat surface, an opposed corresponding portion of the flat surface of the other half-section being provided with an integral laterally projecting stud having a reduced neck and an enlarged terminal head, said neck being adapted to permit a portion of the fishing line to be coiled thereon and said head telescoping into and being removably keyed in said socket.

5. The sinker defined in claim 4, and wherein said socket is in line with and midway between the ends of said groove, said terminal head being of truncated conical form and said socket being conformable in size and shape thereto.

References Cited by the Examiner
UNITED STATES PATENTS

| | | | |
|---|---|---|---|
| 676,724 | 6/01 | McCargar et al. | 43—44.91 X |
| 1,240,043 | 9/17 | Gregory et al. | 43—44.9 |
| 2,601,424 | 6/52 | Baker | 24—49 |
| 2,803,953 | 8/57 | Zubalik. | |
| 2,958,153 | 11/60 | Yerman et al. | 43—44.91 X |

FOREIGN PATENTS 1,259,964  3/61  France.

ABRAHAM G. STONE, Primary Examiner.

SAMUEL KOREN, Examiner.